United States Patent [19]

Marshall

[11] 3,909,553

[45] Sept. 30, 1975

[54] LINE CARD FOR KEY TELEPHONE SYSTEMS ADAPTED TO PROVIDE MUSIC DURING HOLD CONDITION

[75] Inventor: Richard A. Marshall, Bensenville, Ill.

[73] Assignee: GTE Automatic Electric Laboratories Incorporated, Northlake, Ill.

[22] Filed: Apr. 1, 1974

[21] Appl. No.: 456,937

[52] U.S. Cl. .................................. 179/99; 179/81 R
[51] Int. Cl.[2] .......................................... H04M 1/21
[58] Field of Search ................. 179/99, 81 R, 84 VF

[56] References Cited

UNITED STATES PATENTS

| | | | |
|---|---|---|---|
| 3,246,082 | 4/1966 | Levy | 179/99 |
| 3,794,774 | 2/1974 | Kemmerly et al. | 179/99 |

*Primary Examiner*—Kathleen H. Claffy
*Assistant Examiner*—Gerald L. Brigance
*Attorney, Agent, or Firm*—Robert J. Black

[57] ABSTRACT

A key telephone system line card that includes provisions for supplying music to a connected subscriber when a telephone instrument associated with the line card is operated in the hold condition. The two winding line relay included in a conventional key telephone line card is utilized to provide transformer coupling from a music source to the connected telephone line.

3 Claims, 1 Drawing Figure

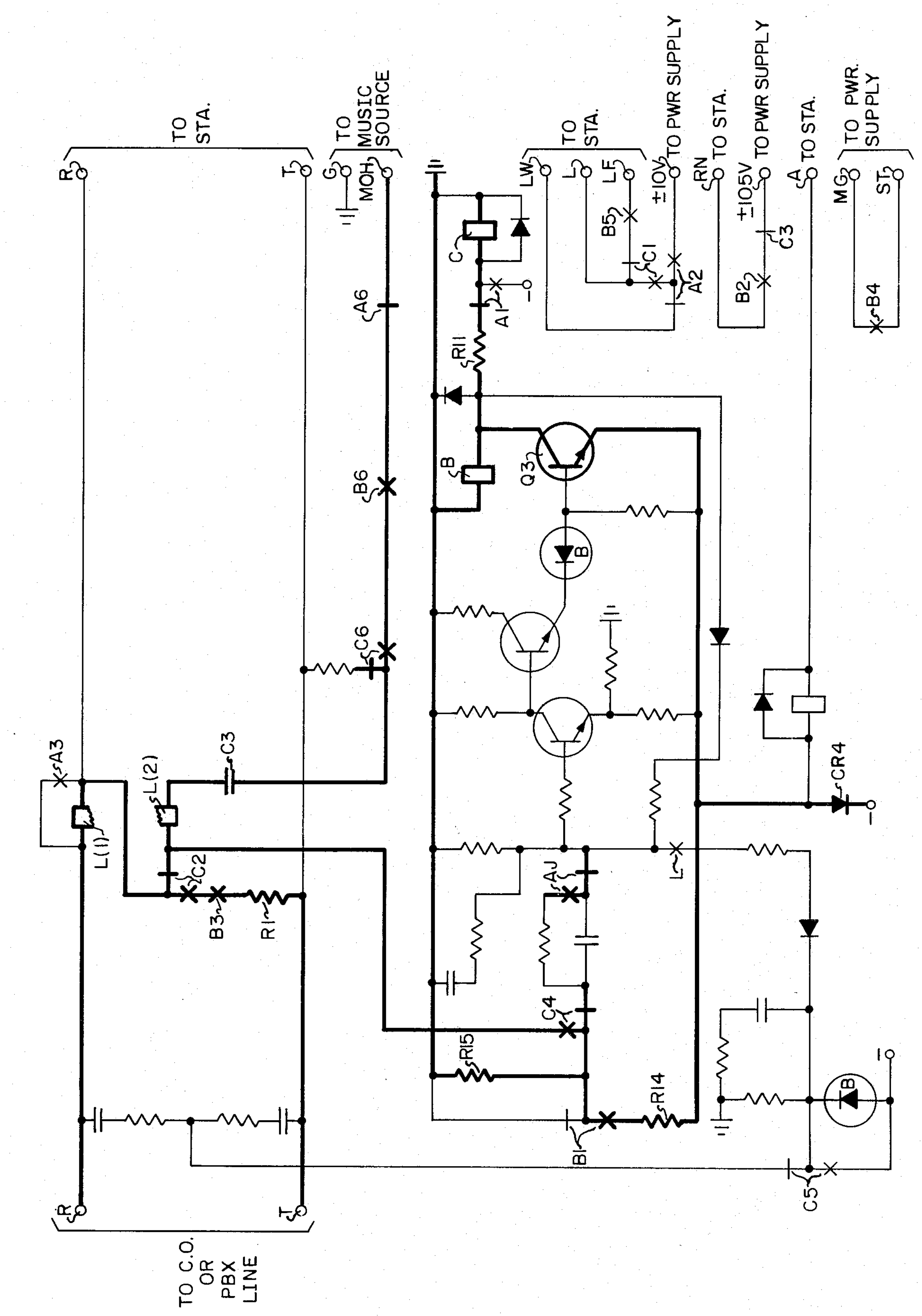
TO STA.
TO MUSIC SOURCE
TO STA.
TO PWR SUPPLY
TO STA.
TO PWR SUPPLY
TO STA.
TO PWR. SUPPLY
TO C.O. OR PBX LINE
Q3
CR4
R11
R14
R15
R1
L(1)
L(2)

LINE CARD FOR KEY TELEPHONE SYSTEMS ADAPTED TO PROVIDE MUSIC DURING HOLD CONDITION

BACKGROUND OF THE INVENTION

1. Field of the Invention:

This invention relates to key telephone systems and more particularly to line cards for use in key telephone systems that provide music to a connected telephone subscriber when the telephone instrument associated with the line card is placed in a hold condition.

2. Description of the Prior Art:

Most key telephone systems include a provision where the user of a key telephone who is engaged in conversation with a telephone subscriber through a telephone central office, may temporarily disconnect the talking circuit of his telephone, from the connected line, but not completely disconnect the line. This operation, usually initiated by operation of a manual push button, is referred to as placing the line on "hold". It is normally utilized when the key telephone user wishes to answer another telephone or temporarily retire from the conversation. After a period of time, by operation of an appropriate "connect" key, the line placed on hold may again by communicated with by the key telephone user.

In key telephone systems when a connected party is placed on hold, the party may believe that he has been disconnected. This condition results because the line sounds "dead". Because of this he may hang up believing he is no longer connected. When the key telephone system user who placed the line on hold, again picks up the line on "hold" to resume the conversation, obviously the connected party is no longer there and the key telephone user may feel that dis-connection was a result of some sort of system failure within the key telephone system or telephone central office.

One solution to the above outlook is to connect some form of signal to the calling party during that period when he is on hold, to advise him that he has not been dropped from the telephone line. It has been found that if this identifying signal is music it will perhaps serve the additional purpose of lessening annoyance of a party that has been placed on hold for any extended period of time.

The line card associated with each telephone line served by a key telephone is the basic connecting and control unit for the key telephone. Obviously if signals are to be provided to advise a connected subscriber that he has been placed on hold, the appropriate place for addition of this feature is at the line card. A number of manufacturers of key telephone system products provide line cards which are capable of coupling music to the subscriber who has been placed on hold. The model 400E manufactured by ITT and the model 4200A manufactured by San-Bar provide this feature. All of them however utilize some form of separate transformer unit or RC network to connect a music source to the telephone associated with the line card when the key telephone has been operated to place the associated line on hold. If transformer coupling is used, it is obvious that substantial additional cost is involved in providing the music on hold feature. Further if RC components are used additional noise may be introduced into the telephone line. In the present invention transformer coupling with the obvious advantages is provided without additional cost, by utilization of the two winding line relay as a transformer for coupling music from a music source to the connected telephone line.

SUMMARY OF THE INVENTION

In the present invention a standard key system telephone line card, WA-1400-D as manufactured by GTE Automatic Electric Incorporated is modified to provide music when a connected subscriber is placed on hold by user of a key telephone connected to the line card. Included in the standard line card is a reed relay which includes two windings on the relay. This relay is used as a transformer for coupling of music to the telephone line. Additional modifications of the standard line card include the addition of extra relay contacts to switch the electrical connection of the reed line relay windings, so that while the line card is holding the line, the reed relay may be used as a transformer, with one winding connected to the telephone line and the other connected to a source of music. This source of music may be a magnetic tape playback unit, FM radio receiver etc. No specific requirement for the music source exists, save to provide electrical output signals of suitable characteristics for connection to the telephone line through the line relay included on the line card.

DESCRIPTION OF THE DRAWING

The single sheet of drawings appended hereto is a schematic circuit diagram of a standard key system telephone line card modified for provision of music on hold in accordance with the present invention. In the drawing it should be noted that those portions of the standard line card circuit which are utilized during the music on hold and/or were modified to provide this feature, are shown in heavier lines. Lighter lined portions are those portions of the key telephone line not specifically required for provision of the hold feature.

DESCRIPTION OF THE PREFERRED EMBODIMENT

Referring now to the accompanying drawing, as noted above the circuitry is similar to that of the standard WA-1400-D line card manufactured for by GTE Automatic Electric Incorporated and used in the type 10A2 key telephone system manufactured by the same manufacturer. This line card provides all the normal features of key telephone system lines and is similar in operation to those found in my copending U.S. Pat. application Ser. No. 318,143 filed on Dec. 26, 1972. The major differences between the key telephone line card of the present invention and the standard units previously noted, appear after the line card has been operated to place a connected telephone line in the hold condition.

Assume now that the user of a key telephone connected to a key telephone line card in accordance with the present invention to a connected subscriber over a central office or PBX line has placed the connected line in the hold position. During this operation relays B, C and L are operated and relay A is restored. Relay L is operated over a path leading from the telephone central office or PBX over the intervening line, to terminal R, through the upper winding (L1) of relay L, through make contacts C2 and B3 and resistor R1 to connect by way of terminal T to the line extending to the telephone central office or PBX. Relay B is held operated over a path from ground to relay B through the collector-emitter path of transistor Q3 and diode CR4 to battery. Relay C is held operated over a path from the coil of relay C, break contact A1, resistor R11 and the collector-emitter path of transistor Q3 as well as through diode CR4 to battery. The holding path for termination of the line while in the hold condition includes resistor R1 and coil L(1) of relay L.

Normally a key telephone system will include several line cards connected to several telephone lines all of which in accordance with the present invention will have their MOH terminals connected together and connected (with return being made through ground), to a common source of music signals. As noted previously this source may include tape playback units, record players, FM tuners or any other conventional form of music distribution system.

With music signals present across terminals MOH and G the signals will be conducted through break contact A6, make contacts B6 and C6, capacitor C3, the lower coil L(2) of relay L, through amke contact C4 and resistor R15 to ground. In this manner the lower winding L(2) of relay L acts as the primary of a transformer for coupling the music signals to the telephone line attached to the present line card. The secondary winding of the transformer is coil L(1) of relay L, with coil L1 being connected across terminal R and through make contacts C2, B3 and resistor R1 to terminal T providing the necessary connections from the secondary winding of the transformer to the telephone line, over which the music signals will then be coupled during hold operation, to the connected subscriber who has been placed on hold.

Optionally in the circuitry disclosed a line card providing the music on hold feature, could include an impedance placed in series with the lead connected to terminal MOH and from terminal MOH to ground, to optimize the frequency response from source to line. While but a single embodiment of the present invention has been shown it will be obvious to those who are skilled in the art that numerous modifications may be made without departing from the spirit of the present invention which shall be limited only by the scope of the claims appended hereto.

What is claimed is:

1. A key telephone line card initially operated to connect a subscriber's key telephone station instrument to a telephone line, and further operated in response to said station instrument to disconnect said instrument from said telephone line, and connect a holding circuit across said telephone line, said telephone line card including: a line relay including a first winding and a second winding initially connected serially across said telephone line; a plurality of relays operated in response to said telephone instrument hold signal to disconnect said first and second windings serially connected across said line and connect said first winding in said holding circuit across said telephone line and connect said second winding to a source of audio frequency signals; whereby audio frequency signals from said source are coupled from said second winding to said first winding and then transmitted over said connected line.

2. A key telephone line card as claimed in claim 1 wherein said line relay is a two winding reed relay.

3. A key telephone line card as claimed in claim 1 wherein there is further included: impedance means connected between said audio-frequency signal source and said second winding.

* * * * *

UNITED STATES PATENT OFFICE
CERTIFICATE OF CORRECTION

PATENT NO. : 3,909,553
DATED : SEPTEMBER 30, 1975
INVENTOR(S) : RICHARD A. MARSHALL

It is certified that error appears in the above-identified patent and that said Letters Patent are hereby corrected as shown below:

Column 4, line 13, after "to" insert -- a hold signal from --

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*